March 10, 1964 E. SCHWARTZ ETAL 3,123,964
LAWN EDGERS
Filed Feb. 7, 1962 2 Sheets-Sheet 1
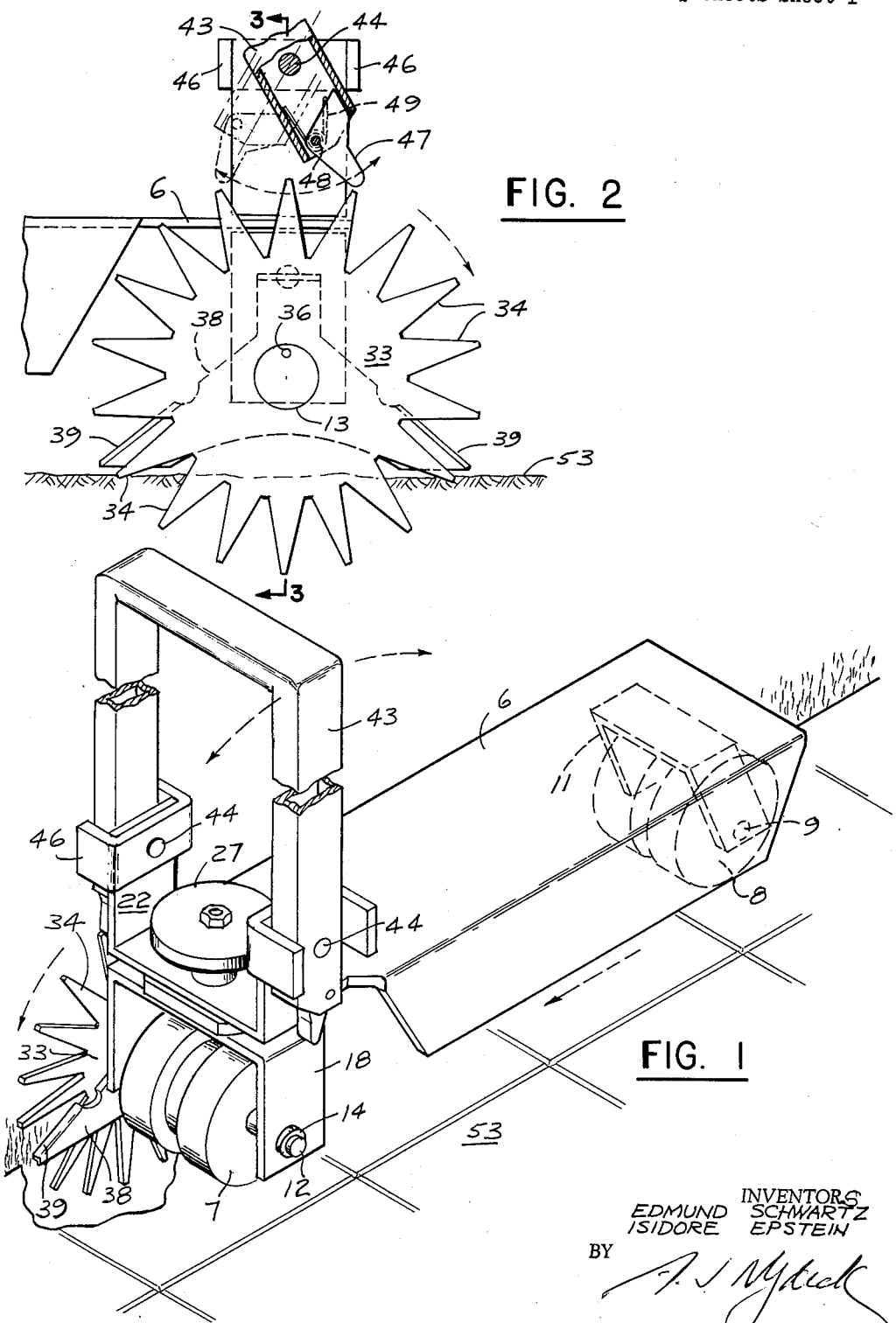
INVENTORS
EDMUND SCHWARTZ
ISIDORE EPSTEIN
BY
ATTORNEYS

INVENTOR.
EDMUND SCHWARTZ
ISIDORE EPSTEIN
BY
ATTORNEYS

# 3,123,964
LAWN EDGERS
Edmund Schwartz, Fair Lawn, N.J., and Isidore Epstein, New Hyde Park, N.Y., assignors to Leisure Research Corporation, Richmond Hill, N.Y., a corporation of New York
Filed Feb. 7, 1962, Ser. No. 171,669
6 Claims. (Cl. 56—256)

This invention relates to a novel edging cutter for lawns which achieves great convenience and facility of operation by combining the rolling characteristics of a scooter with a lever action of the scooter's handle to make possible the guidance and powering of a lawn edging cutter by the arm muscles while the operator is in a comfortable standing position.

The elements of this invention are a scooter platform, a pair of roller wheels to support the platform, a multiple toothed cutting wheel having a horizontal axis and preferably keyed to the rotation of the front scooter roller, a stationary cutting blade for shearing cooperation with the rotary cutting wheel, a horizontally pivoted lever handle for the scooter, and ratchet means for converting forward and backward reciprocations of the lever handle into rotation of the foregoing cutting wheel.

In the preferred embodiment of the subject device convenient means are provided for converting the device from a right handed edging cutter into a left handed cutter to accommodate different geometries of lawn.

The principal object of this invention is to provide a design of a lawn edging cutter which will provide a rapid and powerful cutting action while the operator is in a comfortable erect position.

Another object is to provide a transport platform for an edging grass cutter which will inherently produce straight edges.

Still another object is to provide a lawn edging device which operates at a high rate of progression for light cutting loads, and yet which has available high shearing torques for heavy cutting loads.

For other objects and a better understanding of the invention, reference may be had to the following detailed description taken in conjunction with the accompanying drawings in which:

FIGURE 1 is a perspective view of the preferred embodiment of the subject inventions;

FIGURE 2 is a fragmentary view of the side elevation showing the cutting wheel.

Figure 3:
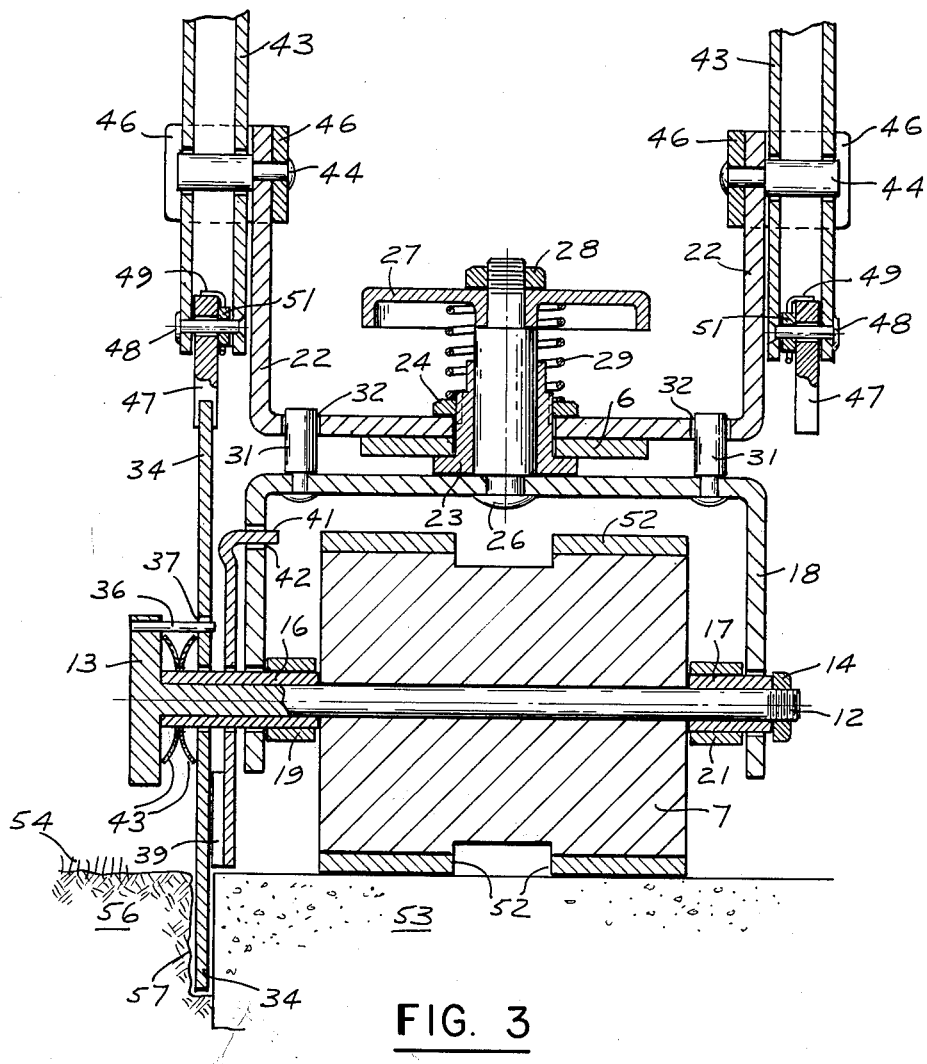
FIGURE 3 is an enlarged partial sectional view along the lines 3—3 of FIGURE 2.

Referring to the drawings, 6 designates a foot-rest platform which together with a front roller 7 and a rear roller 8 comprises a form of scooter. Rear roller 8 is journalled on spindle 9 which is supported relative to and secured to platform 6 by a U-shaped bracket 11.

Front roller 7, FIGURE 3, is assembled on and frictionally secured to spindle 12 which has a headed end 13 and is threaded at the other end to receive a nut 14 so that front roller 7 may be clamped by sleeves 16 and 17 between head 13 and nut 14. Sleeves 16 and 17 are journalled in a front roller fork 18. Two sleeves 19 and 21 act as spacers between roller 7 and fork 18.

Platform 6 has a handle bracket 22 secured to its front end both by welding and by a bearing sleeve 23 which is provided with a clamping nut 24.

A vertical spindle 26 is secured at its bottom end to fork 18 by riveting, and is journalled in sleeve 23 relative to platform 6. A handle 27 is keyed to the upper shank of spindle 26 and clamped thereto by a nut 28. A compression spring 29 acting between handle 27 and nut 24 is provided to insure that, normally, fork 18 will be prevented and locked from rotation about spindle 26 relative to platform 6 because of the engagement of the studs 31, riveted to fork 18, with holes 32 in the platform 6. Holes 32 are disposed 180° apart about the axis of sleeve 23, so that by manually depressing handle 27 downward against spring 29 sufficiently to retract studs 31 from holes 32 until they clear platform 6, the fork 18 and roller 7 may be rotated 180° about the sleeve 23 thereby allowing studs 31 to be re-engaged in holes 32 thus again locking fork 18 in its alternative position.

A cutting wheel 33 having multiple teeth 34 of rectangular cross section is mounted axially on bearing sleeve 16 and is keyed to the rotation of spindle 12 by means of a pin 36 which is mounted in spindle head 13 and engages a hole 37 in cutting wheel 33.

A stationary shear 38 is provided with two oppositely facing cutting blades 39 which cooperate with moveable cutting teeth 34 to produce a grass shearing action. Shear 38 is mounted on rotary sleeve 16 and prevented from rotation by an integral tang 41 which engages a hole 42 in fork 18.

Two belleville cup springs 43 mounted on sleeve 16 act axially between head 13 of spindle 12 and cutting wheel 33 so as resiliently to press teeth 34 into shearing engagement with stationary blades 39 of shear 38.

An operating lever handle 43 formed from rectangular tubing in the shape of a U is pivotally secured to bracket 22 about a horizontal axis by the studs 44.

A pair of U-shaped stop members 46 is provided to limit the angular excursion of handle 43 from the vertical relative to bracket 22. Members 46 and 22 are secured together by the riveting over of the shanks of pivot studs 44.

A pair of pawls are pivotally mounted one on each side near the lower ends of handle lever 43 beyond pivot studs 44 by means of the pivot pins 48. Torsion springs 49, mounted on spacers 51 act between handle 43 and each pawl 47, so as to permit resiliently biased counter-clockwise rotation of pawl 47 as seen in FIGURE 2, but to prevent its clockwise rotation because of its abutment against handle 43.

The trajectory of either pawl 47 is such that whichever one is located on the current cutter wheel side will intersect the trajectory of the cutter wheel teeth 34.

The designated location of pivots 12, 44, and 48, and the proportions of teeth 34 and pawl 47 are so chosen that one reciprocation of handle 43 about studs 44 first forward and then back between the limits of stop members 46 will always result in the ratcheting of pawl 47 past at least one tooth 34 and the subsequent camming in a clockwise direction (FIG. 2) of cutter wheel 33. Due to the large lever ratio between the distances from pivots 44 to the top of the handle 43 and to the pawl pivots 48, a powerful force multiplication results. This mechanical advantage permits large shearing torques to be delivered to cutting wheel 33 in response to relatively light forces applied to the upper operating end of lever 43.

Since the teeth 34 of wheel 33 are symmetrical, reversal of wheel 33 from right-handed to left-handed positions by the operation of handle 27 will again result in a forward cutting action as handle 43 is reciprocated.

Front and rear rollers 7 and 8 are each provided with a resilient tread 52 (FIG. 3) to improve traction and protect the sidewalk 53 which the subject device is edging.

Evidently, it is not necessary for the operation of the device that the lawn being edged be bordered by a sidewalk as shown in the figures.

The operation of this invention is as follows:

For rapid edging of a lawn which presents a light cutting load, the operator first selects, by the operation of handle 27, the right-handed or left-handed mode of operation corresponding to his selected direction of travel along the edge of the lawn 54. In the figures, for instance, cutting wheel 33 is positioned for right-handed operation, meaning that the lawn to be edged lies on the right side of the direction of travel.

The operator then grasps handle 43 at its top cross bar portion, and placing one foot on platform 6, pushes forward on handle 43 until it comes to rest on stop 46 and pushes backward with his other foot on the ground thereby propelling platform forward in scooter manner. The resulting forward motion of platform 6 causes rotation of rollers 7 and 8 and of cutter wheel 33 so as to generate a continuous shearing action between foremost blade 39 and the cutting wheel teeth 34. In addition, the entry of teeth 34 into the earth 56 (FIG. 3) leaves an edging channel 57 due to the fact that the peripheral velocity of teeth 34 must be greater than the velocity of forward motion of platform 6, since teeth 34 are driven through pin 36 by the smaller diameter of roller 7.

The fixed parallel axes of rollers 7 and 8 also tend to maintain the edging operation in a straight line as required by most lawns.

This rapid scooter style transport of the edging cutter is continued until or if the operator encounters a greater cutting load such as that presented by roots. At this point the operator may stop or reduce the forward motion of platform 6 and begin to apply a forward and backward reciprocation of handle 43 moving ratchet teeth 34 forward by one ratchet pawl 47, thereby generating a high torque cutting progression of cutting wheel 33 against stationary shear blade 39 or against the resistance of roots in edging channel 57. It will be understood, of course, that the instant lawn edging device can be moved curvilinearly when used for trimming the edges of curved pavings which abut the greensward.

It will further be observed that the cutter blade exercises cutting action above the surface with a scissors-like effect. The rotary component penetrates the sub-surface region and shears against the stationary blade which is not dragged through the ground.

After this increased load has been overcome, the operator may proceed rapidly as before.

While various changes may be made in the detailed construction shown, it shall be understood that such changes shall be within the spirit and scope of the present invention as defined by the appended claims.

It is further to be understood that the foregoing description and the embodiment shown are merely illustrative of the principles of this invention; and that the appended claims are to be construed as defining the invention within the full spirit and scope thereof.

We claim:

1. A lawn edging device comprising an elongated scooter platform, a rear roller wheel journalled on said platform with an axis parallel to said platform and at right angles to the elongated axis of said platform, a front fork member, means journalling said fork member on said platform on a central axis to enable complete reversal of the fork member between two opposite positions relative to the sides of the platform, a front roller wheel, means to journal said front roller wheel on said fork about a horizontal axis, detent means to lock said fork in either of two positions wherein said front roller wheel axis is parallel to the axis of said rear roller wheel, a cutter wheel, means to journal said cutter wheel coaxially with said front roller wheel at one side of the platform, a plurality of cutting teeth in said cutting wheel, a pair of shear blades secured to said fork, said shear blades being proximate to said cutting teeth at each end of a chord of said cutting wheel lying parallel to said platform, a handle, and means to secure said handle to said platform.

2. In a device in accordance with claim 1, said handle securing means including a journal permitting limited angulation of said handle about an axis parallel to said rear roller wheel axis, a first pawl secured to said handle for ratcheting against the teeth of said cutting wheel when said fork is locked in one of said two positions, and a second pawl secured to said handle for ratcheting against the teeth of said cutting wheel when said fork is locked in the other of said two positions.

3. A lawn edging device comprising a scooter platform, supporting means for said platform including at least one roller journalled at a forward portion thereof for rotation about a substantially horizontal axis, a cutting wheel mounted coaxially with said roller and having sharpened teeth extending radially beyond the periphery of said roller, a shear blade supported by said platform in position against the face of said cutting wheel, said shear blade having a substantially horizontal lower cutting edge extending chordally across said cutting wheel at a level slightly above the lowermost peripheral portion of said roller, whereby in the course of shearing action by said wheel and shear blade the shear blade rides at a level above the ground surface on which the lawn edging device is operated, including means on said platform supporting said roller, cutting wheel and shear blade for adjustment about a vertical pivot axis to permit shifting of said cutting wheel and shear blade from one side of the platform to the other, and wherein said shear blade presents a cutting edge in proximity to said teeth of the cutting wheel at both sides of its axis, whereby the cutting wheel and shear blade are effectively operable when at either side of said platform during forward travel.

4. A lawn edging device comprising a scooter platform, grass trimming means including a rotary toothed wheel and a relatively stationary shear blade cooperative with said wheel, means mounting said grass trimming means and pivotally connecting the same to said platform for swinging movement from one side of the platform to the other, means for driving said cutting wheel, and roller means supporting said scooter platform for forward travel.

5. A device according to claim 4, wherein said driving means comprises ratchet means operable to rotate said cutting wheel when the same is at either side of said platform, and a handle for manually operating said ratchet means.

6. A device according to claim 4, including a ground-engaging roller coaxially connected to said cutting wheel.

References Cited in the file of this patent

UNITED STATES PATENTS

| | | |
|---|---|---|
| 1,714,817 | Randleman | May 28, 1929 |
| 2,626,499 | Wick | Jan. 27, 1953 |
| 2,901,878 | Johnson | Sept. 1, 1959 |